United States Patent
Druzhinin et al.

(10) Patent No.: US 10,897,517 B2
(45) Date of Patent: Jan. 19, 2021

(54) DISTRIBUTED CACHE LIVE MIGRATION

(71) Applicant: HUAWEI TECHNOLOGIES CO., LTD., Guangdong (CN)

(72) Inventors: Igor Vyacheslavovich Druzhinin, Shenzhen (CN); Mikhail Evgenyevich Mysov, Shenzhen (CN); Mikhail Valerevich Zenkovich, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 199 days.

(21) Appl. No.: 15/959,112

(22) Filed: Apr. 20, 2018

(65) Prior Publication Data

US 2018/0241838 A1 Aug. 23, 2018

Related U.S. Application Data

(63) Continuation of application No. PCT/RU2015/000696, filed on Oct. 21, 2015.

(51) Int. Cl.
*G06F 9/455* (2018.01)
*H04L 29/08* (2006.01)
(Continued)

(52) U.S. Cl.
CPC ...... *H04L 67/2852* (2013.01); *G06F 9/45558* (2013.01); *G06F 12/084* (2013.01);
(Continued)

(58) Field of Classification Search
USPC .......................................................... 718/1
See application file for complete search history.

(56) References Cited

U.S. PATENT DOCUMENTS 8,601,473 B1   12/2013 Aron et al.
8,863,117 B2 * 10/2014 Ben-Yehuda ....... G06F 9/45558
                                                        718/1
(Continued)

FOREIGN PATENT DOCUMENTS

CN   103559075 A   2/2014

OTHER PUBLICATIONS

Storage virtualization, From Wikipedia, the free encyclopedia. https://en.wikipedia.org/wiki/Storage_virtualization, downloaded Apr. 18, 2018, 11 pages.
(Continued)

*Primary Examiner* — Kenneth Tang
(74) *Attorney, Agent, or Firm* — Womble Bond Dickinson (US) LLP (57) ABSTRACT

A method, an apparatus, and a system for migrating cache are described. A system for migrating cache may include a first host having a first cache and associated with a VM. The system may also include a second host having a second cache. Furthermore, in the system, the first host is adapted to send cache data of the first cache to the second host in response to a notification, said cache data associated with the VM and said notification indicating that the VM is to be migrated from the first host to the second host. Furthermore, the first host is adapted to send write operations associated with the VM to the second host in response to receiving the notification. In the system, the second host is adapted to apply, in response to receiving the notification, read operations associated with cache data of the VM to the first cache if said cache data is not present in the second cache, and to apply write operations associated with cache data of the VM to the second cache.

15 Claims, 6 Drawing Sheets

(51) Int. Cl.
*G06F 12/0866* (2016.01)
*G06F 12/0868* (2016.01)
*G06F 12/0842* (2016.01)
*G06F 12/084* (2016.01)
*G06F 12/0891* (2016.01)

(52) U.S. Cl.
CPC ...... *G06F 12/0842* (2013.01); *G06F 12/0866* (2013.01); *G06F 12/0868* (2013.01); *G06F 12/0891* (2013.01); *H04L 67/1097* (2013.01); *G06F 2009/4557* (2013.01); *G06F 2009/45583* (2013.01); *G06F 2009/45595* (2013.01); *G06F 2212/151* (2013.01)

(56) References Cited

U.S. PATENT DOCUMENTS

| | | | | |
|---|---|---|---|---|
| 8,930,947 | B1* | 1/2015 | Derbeko | G06F 9/45558 711/113 |
| 9,612,966 | B2* | 4/2017 | Joshi | G06F 9/45558 |
| 10,042,768 | B1* | 8/2018 | Karnowski | H04L 67/1097 |
| 2008/0222375 | A1 | 9/2008 | Kotsovinos et al. | |
| 2012/0324443 | A1* | 12/2012 | Low | G06F 9/45504 718/1 |
| 2013/0111474 | A1 | 5/2013 | Agarwal et al. | |
| 2013/0198459 | A1* | 8/2013 | Joshi | G06F 12/084 711/130 |
| 2014/0013059 | A1* | 1/2014 | Joshi | G06F 9/45558 711/144 |
| 2014/0052892 | A1 | 2/2014 | Klein et al. | |
| 2014/0059292 | A1* | 2/2014 | Phelan | G06F 9/5088 711/113 |
| 2014/0215459 | A1* | 7/2014 | Tsirkin | G06F 9/45558 718/1 |
| 2014/0297780 | A1* | 10/2014 | Zhou | H04L 67/2847 709/216 |
| 2015/0039717 | A1 | 2/2015 | Chiu et al. | |
| 2015/0229717 | A1* | 8/2015 | Gupta | H04L 67/34 718/1 |
| 2016/0197986 | A1* | 7/2016 | Chambliss | G06F 9/45558 709/213 |

OTHER PUBLICATIONS

Storage area network, From Wikipedia, the free encyclopedia. https://en.wikipedia.org/wiki/Storage_area_network, downloaded Apr. 18, 2018, 8 pages.

Converged storage, From Wikipedia, the free encyclopedia. https://en.wikipedia.org/wiki/Converged_storage, downloaded Apr. 18, 2018, 4 pages.

Holland, David A., et al. "Flash caching on the storage client." USENIX ATC13 Proceedings of the 2013 USENIX conference on Annual Technical Conference. USENIX Association, 2013, 12 pages.

Clark, Christopher, et al. "Live migration of virtual machines." Proceedings of the 2nd conference on Symposium on Networked Systems Design and Implementation—vol. 2. USENIX Association, 2005, 14 pages.

* cited by examiner

DISTRIBUTED CACHE LIVE MIGRATION

CROSS-REFERENCE TO RELATED APPLICATIONS

This application is a continuation of International Application PCT/RU2015/000696, filed on Oct. 21, 2015, the disclosure of which is hereby incorporated by reference in its entirety.

TECHNICAL FIELD

The present application relates to the field of distributed caches, and particularly to a method, an apparatus, and a system for migrating cache.

BACKGROUND

Virtualization refers to a concept of abstraction of resources provided by computing devices. Applications, including an operating system, may run within a virtual machine (VM) which appears to the applications as a single physical host. Multiple VMs may be present on a same physical host. Virtualization therefore requires to maintain, for each VM, the illusion that it has exclusive access to resources associated with the VM. Such resources are referred to as virtual. VMs may be managed by a virtual machine manager (VMM) on the same host as the VMs.

Resources presented in a virtualized environment may include virtual CPU, virtual memory, virtual I/O devices, and others. One aspect of virtualization is storage virtualization, where resources correspond to virtual storage. Virtual storage may be presented to a VM as one or more virtual disks. From the perspective of the VM, data may be written to and read from a virtual disk, whereas the virtual disk may actually correspond to a collection of storage spaces distributed in various locations, including locations not locally present on a computing device running the VM.

Virtual storage is subject to significant latency when reading or writing data, especially if parts of the virtual storage reside in remote locations. In order to reduce such latency, caching may be provided. A cache may comprise memory, such as Flash memory, which is faster than conventional memory used for large-scale storage, and which may be associated with local (virtual) storage and may comprise data from various parts of the storage, including data in remote locations. In some cases, a cache may include data from other caches in local or remote locations. Caches, similar to virtual disks, may be distributed across multiple locations, such as in order to overcome restrictions of storage space in one or more locations. Caches having at least one of these properties are also referred to as a distributed cache.

A VM may request data to be read or written to a virtual disk. In response to such request, a cache associated with the VM may be analyzed for the data. If present, the data may be read from or written to the cache, rather than directly to storage behind the cache. Data associated with multiple VMs may be maintained in a single cache.

A VM may have to be migrated from one location to another, such as from an original physical host to a destination physical host. During migration, operability of the VM may be restricted. As an example, migrating the VM may require transferring local memory occupied by the VM at an original host to a destination host. Migration may further include associating the VM with a different VMM in order to install the VM on the destination host. Applications inside the VM should ideally not be affected by the changes. In particular, access to storage and other resources should remain unaltered from the perspective of the VM.

Migration of a VM also includes migrating cache data associated with the VM. While cache data may be distributed across multiple locations, it is not desirable to maintain the majority of data associated with a VM in a cache which is no longer local to the VM after migration.

A known approach to migrating a cache is clearing all data associated with the VM in the course of migration. In this case, data requested by the VM after clearing will have to be retrieved from the storage, rather than from cache. While such retrieval may concurrently be used to fill a cache at the destination host, also referred to as cache warming, this process is generally slow. It will take some time until the new cache is warm and fully usable. Until then, latency for data operations will be high due to retrieving all data from storage.

SUMMARY

An objective of the present disclosure is seamlessly migrating a VM cache from one host to another host. Seamless migration means that operation of the VM is maintained throughout the migration process, to the extent possible.

A first aspect of the disclosure defines a system comprising a first host comprising a first cache and associated with a VM; and a second host comprising a second cache; wherein the first host is adapted to send cache data of the first cache to the second host in response to a notification, said cache data associated with the VM and said notification indicating that the VM is to be migrated from the first host to the second host, and wherein the first host is adapted to send write operations associated with the VM to the second host in response to receiving the notification; and wherein the second host is adapted to apply, in response to receiving the notification, read operations associated with cache data of the VM to the first cache if said cache data is not present in the second cache, and to apply write operations associated with cache data of the VM to the second cache.

The first aspect provides a system which advantageously accomplishes seamless migration of the VM. According to this aspect, read and write operations are received and processed at the second host upon notification of the migration and upon sending cache data from first to second cache. In other words, read and write operations are processed without waiting until all cache data is transferred to the second cache. This advantageously accomplishes seamless migration to the extent that operations are handled without delay. This advantage results from a synergistic effect which involves processing write operations on the second cache and processing read operations conditionally on the second cache or the first cache, depending on whether the respective data to be read has already been written to the second cache. As the cache data progresses in its transfer from first to second cache, the number of read operations which are redirected to the first cache decreases, hence reducing the bandwidth overhead used during migration.

According to a first embodiment of the first aspect, the second host is further adapted to apply read operations associated with the VM only to the second cache in response to determining that no further cache data of the VM is to be sent from the first host to the second host.

This first embodiment is advantageous in that it defines ceasing conditional reading from the first cache, but restricting the processing of read operations to the second cache.

Because no further cache data is to be sent to the second host, there is no further need to conditionally read from the first cache. The overhead of conditionally redirecting read operations to the first cache is thereby avoided. It is to be noted that the feature of determining that no further cache data is to be sent does not mean that no more cache data of the VM is present at the first cache. In fact, cache data sent to the second host is still present at the first cache until being deleted. Further, the VM may be associated with certain data that is distributed among multiple hosts; therefore, some of its data may continue to be present at the first cache even though no more data is to be sent to the second host.

A second embodiment of the first aspect comprises deleting sent cache data in the first cache in response to determining that no further cache data of the VM is to be sent from the first host to the second host.

An advantage of this second embodiment is that read operations are no longer redirected to the first host after determining that no further cache data is to be sent, as is defined in the first embodiment above. The cache data previously sent to the second host is therefore no longer needed, and the corresponding storage space may be freed.

According to a third embodiment of the first aspect, the system comprises a cache controller adapted to send the notification.

This embodiment is advantageous in that it provides a single entity responsible for organizing multiple caches. This entity, the cache controller, may hence be aware which host includes cache data associated with a given VM. It may also be aware of ongoing sending operations, hence knowing where migration processes are in progress and whether a migration process has completed. By sending notifications to hosts, the cache controller can advantageously and conveniently relieve hosts from determining migration operations themselves.

A fourth embodiment defines that sending cache data includes sending most recently retrieved, most recently written, or most frequently accessed data first.

The fourth embodiment adds to the inventive height of the first aspect in that it increases the likeliness that read operations, when performed at the second host, actually obtain the cache data they need, without having to redirect to the first host. This advantage is due to the fact that the read operations are likely to access most recently retrieved, most recently written, or most frequently accessed data again, rather than other data. Because this data is treated with priority over other data, redirection of read operations is avoided in many cases. This further reduces resource usage and improves the responsiveness of the system.

According to a fifth embodiment, cache data includes cache metadata.

This fifth embodiment further adds to the first aspect in that it distinguishes data from metadata. The latter may include information such as retrieval frequency or number of accesses, hence providing a simple solution to practicing the fourth embodiment discussed above.

A sixth embodiment of the first aspect defines that the first host is further adapted to apply write operations associated with the VM to the first cache in addition to sending said write operations to the second host.

This takes account of the fact that data just written is likely to be read soon. Duplicating the write operation for the first cache host therefore anticipates an upcoming read directed to this data, hence reducing the overhead at the first cache host for accessing this data.

A second aspect is directed to a host device comprising a local cache and adapted to receive, in response to a notification, cache data from a remote cache of a remote host, said cache data associated with a VM, said VM associated with the remote host, and to apply read operations associated with cache data of said VM to the remote cache if said cache data is not present in the second cache, and write operations associated with the cache data of the VM to the local cache, said notification indicating that the VM is to be migrated from the remote host to the host device.

The host device defined by the second aspect may be regarded as corresponding to the second host of the first aspect, with remote cache and local cache corresponding to first and second caches, respectively. The second aspect hence advantageously accomplishes seamless migration of a VM. After initiating sending cache data from the remote host to the local host, read and write operations directed to the cache data can be served with minimal delay. This delay is reduced to cases wherein data to be read is not present on the local host but needs to be fetched from the remote host, for example.

According to a first embodiment of the second aspect, the host device is further adapted to apply read operations associated with the VM only to the local cache in response to determining that no further cache data of the VM is to be sent from the remote host to the host device.

This embodiment, similar to the second embodiment of the first aspect, advantageously decreases the communication overhead once it determines that no further data is to be sent.

A second embodiment of the second aspect includes a notification sent by a cache controller.

This cache controller represents an entity aware of upcoming VM migrations and hence conveniently notifies hosts participating in a migration.

A third embodiment of the third aspect defines that sending cache data includes sending most recently retrieved, most recently written, or most frequently accessed data first.

This embodiment reduces the number of cases where a read operation is actually directed to the remote host. For example, recently retrieved cache data is likely to be retrieved again. Preferring this data in the sending of cache data from the remote to the local host therefore improves responsiveness of the local host and avoids excess communication and delay.

According to a fourth embodiment, the cache data includes cache metadata.

This fourth embodiment clarifies that metadata, such as data regarding frequent retrieval, may be included in the cache data. This assists in assigning priority to certain cache data over other cache data, such as defined in the third embodiment discussed above.

A third aspect of the disclosure is directed to a method, comprising: in response to a notification, receiving cache data from a first cache of a first host, said cache data associated with a VM, and applying read operations associated with the VM to said first cache of the first host if said cache data is not present in the second cache, and applying write operations associated with cache data of the VM to a second cache of a second host, said notification indicating that the VM is to be migrated from the first host to the second host.

The third aspect offers seamless migration of a VM from a first host to a second host. According to this aspect, cache data of the VM is received at the second host in the course of migrating, with the effect that the cache data of the VM is partially available at the second host and partially still at the first host. Despite this ongoing transfer, read and write operations directed to the cache data can be served with minimal delay, as they are conditionally redirected to the first cache or applied to the second cache.

A first embodiment of the third aspect includes that the notification is sent by a cache controller.

The first embodiment provides an entity, namely the cache controller, which is aware of migrations and suited to conveniently notify hosts of a migration, such as of whether migration is started.

According to a second embodiment of the third aspect, the cache data includes cache metadata.

This second embodiment is advantageous for providing additional information required in the migration process. As discussed above, such information may be required when treating certain cache data with priority when sending it to the second host. Such information may be included in cache metadata. Being part of the cache data, it can be accessed without extra communication.

DESCRIPTION OF EMBODIMENTS

Figure 1:
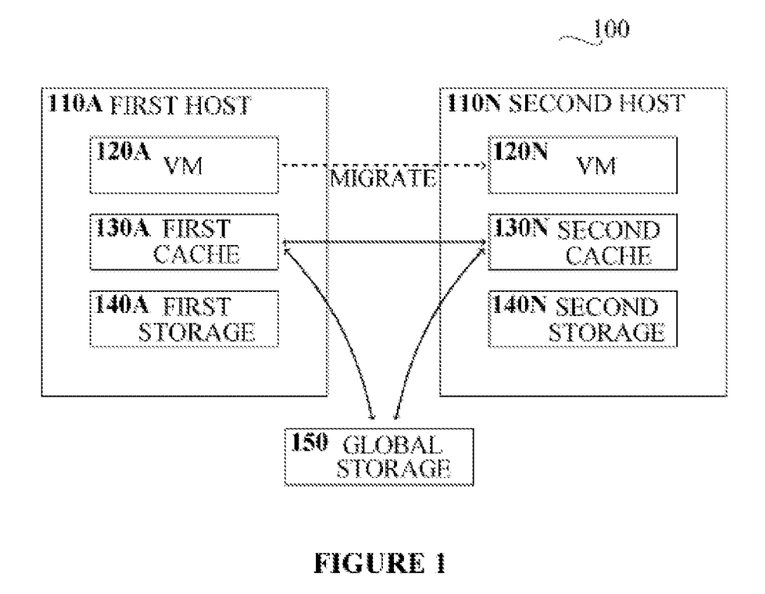
FIG. 1 is a block diagram of a system in accordance with embodiments of the disclosure.

FIG. 1 illustrates a first host 110A, also referred to as an original host, and second host 110N, also referred to as a destination host.

First host 110A is illustrated with a VM 120A but may comprise one or more additional VMs (not depicted). Also, a first cache 130A and first storage 140A are included in first host 110A. The first cache 130A may be distributed across multiple hosts. It may not only include data associated with the VM 120A but also with one or more different VMs. Data from the first storage 140A may be cached in first cache 130A. It may also include data cached by different caches and/or associated with different VMs than with VM 120A. FIG. 1 further illustrates a global storage 150 which may be local or remote from first host 110A.

Cache media used for caches discussed herein include SSD, RAM, and Flash, but are not restricted to these.

Global storage 150 may be a cluster of storage arrays, such as in a conventional virtualized datacenter providing virtual disks to a plurality of virtual machines. Reading data from global storage may be slower than reading from a local cache or even a remote cache in a different host. Data associated with VM 120A may be stored in the global storage 150, and data from the global storage 150 may be cached in first cache 130A.

The first host 110A is coupled with the second host 110N which comprises a second cache 130N and second storage 140N. Second cache 130N may be distributed, as well. Second host 110N is further illustrated with VM 120N which corresponds to the VM 120A after migration from the first host 110A to the second host 110N. Second host 110N, like first host 110A, may include additional VMs or no VMs at all prior to the migration.

The first host 110A may be adapted to receive a notification regarding migration of VM 120A from the first host 110A to the second host 110N. The notification may be from any of various entities, such as by a VMM (not depicted), from second host 110N, or from a cache controller (not depicted) which is associated with one or more of the illustrated caches.

The notification may be received by the first host 110N. For example, it may be received by a VMM, by VM 120A, or by first cache 130A. In one embodiment, the notification specifies the VM to be migrated, as well as and the destination of the migration. The notification may also be received at the second host 110N.

In response to receiving the notification, the first host 110A may react in one or more ways. First host 110A may start sending cache data from the first cache 130A, said cache data associated with the VM 120A, to the second host 110N. Sending cache data may include coordinating transfer policies, such as size and permissions of data, between the first and second host. A reliable connection between both hosts is to be established.

Sending cache data to the second host 110N may include sending all cache data associated with the first VM 120A, or may include only a subset of all cache data in the first cache 130A associated with the first VM 120A. For example, some of the cache data associated with the first VM 120A in the first cache 130A may include cache metadata indicating that corresponding data of said cache data shall not be moved at all for some reason. For example, cache data may have to remain in the first cache 130A because it corresponds to data stored in the first storage 140A in first host 110A. In such case, moving cache data from first cache 130A to a different host might increase responsiveness when retrieving said cache data at the different host, but might decrease responsiveness when the cache data becomes dirty and has to be written to the first storage 140A. In one embodiment, only cache data corresponding to data in storages outside of the first host 110A may be sent to the second host 110N, such as data in the global storage 150 or data in the second storage 140N or data in any other storage.

Sending cache data may be temporarily interrupted at the first host 110A in response to determining that the VM 120A has suspended, such as because it has powered off. Once the VM 120A has resumed, sending data is continued until transfer is complete.

Further in response to receiving the notification, and independent of the sending of cache data having started, the first host 110A may adapt its handling of read and/or write operations, said operations directed to cache data associated with the VM 120A. The first host 110A sends write operations directed to cache data associated with the VM 120A to the second host 110N. This may be advantageous to the extent that the data is written to the second cache 130N. This data hence resides at a location where it is most likely to be accessed next. Thereby, a set of valid cache data for the VM 120A is continually built. The larger this set grows, the smaller is the risk of cache invalidations on the set. In embodiments that perform all write operations to both first and second cache, an exact subset of the first cache is built at the second cache, which will be ready to operate once the VM has migrated. Accordingly, responsiveness of the VM 120N may be increased, especially in case that the data, if written to the first cache 130A, has not been sent to the second host 110N yet. In a particular embodiment, the write operation may be applied to the first cache 130A in addition to applying the write operation to the second cache 130N.

As mentioned above, the notification may also be received at the second host 110N. In response to receiving the notification, the second host 110N may prepare for cache data to be sent by the first host 110A, and may store the received cache data in the second cache 130N. Further in response to receiving the notification, the second host 110N receive write and/or read operations directed to cache data associated with the VM 120N, such as operations issued by the VM 120N itself. Write operations are applied to the second cache 130N. In one embodiment, write operations are additionally sent to the first host 110A, such as when the caches are block-organized. Read operations may be handled by examining the second cache 130N for data to be read by the operation. If the data is already present in second cache 130N, such as when it has already been transferred from the first host 110A, it will be read from the second cache 130N. Otherwise, if the data is not present, the read operation may be sent to the first host 110A, where it is applied to the first cache 130A. Read data is provided to the second host 110N. Determining whether the data is present in the second cache 130N may be regarded as a conventional cache miss.

Sending cache data from the first host 110A to the second host 110N may complete before or after the VM has been migrated. If there is still cache data to be sent when the VM has migrated, the VM may still direct read operations to the first cache 130A until sending has completed.

Completion of the transfer may be indicated to the first host 110A and/or the second host 110N, such as through notification by a cache controller. Alternatively, hosts may determine by themselves whether transfer is complete. For example, the second host 110N may determine that no cache data associated with VM 120N has been received in a predetermined time period. Alternatively, the first host 110A may have notified the second host 110N about the amount of data yet to be transferred, and the second host 110N compares the amount of received cache data with the amount indicated by the first host 110A. In yet another embodiment, the VM 120N is aware of the amount of cache data in the second cache 130N, allowing the second host 110N to determine that no further data is to be received. As yet another alternative, it may be a VMM (not depicted) on the second host 110N which is aware of the amounts of cache data yet to be received.

In some embodiments, the first host 110A may notify the second host 110N and/or a cache controller about transfer having completed. In response to such notification, the cache controller may change ownership of the VM from the first host 110A to the second host 110N, and may notify the second host 110N about the change.

In one embodiment, the second host 110N may stop sending read operations directed to cache data associated with the VM 120N to the first host 110N in response to determining that no further data is to be received from the first host 110A. However, read operations may still be sent to the first host 110A if they are directed to data which is intended to remain at the first cache 130A after migration of the VM.

Cached data may be deleted in the first cache 130A directly after being sent. Alternatively, sent data may be deleted in its entirety after migration is complete and/or after determining that no further cache data of the VM 120N is to be sent from the first host 110A to the second host 110N.

Cache data may be sent from first host 110A to second host 110N in an arbitrary order. In an alternative embodiment, the data may be sent in an order determined according to recent accesses to this data. Data more recently accessed is sent first, whereas data with oldest accesses is sent last. Still with regard to this embodiment, a distinction may be made between write and read accesses. For example, data may be sent in the order of most recent write accesses performed on the data. Alternatively, data may be sent in the order of most recent read accesses. In one embodiment, data may be sent in the order of access frequency, with most frequently accessed data sent first. In all embodiments of ordered sending, cache metadata included in cache data may indicate access statistics, such as access frequency or last access, and may be used to determine a sending order.

At some point after the notification, VM 120A may be powered off at first host 110A in order to be powered on at the second host 110N, thereby completing the migration. This may occur at any time during or after the operations discussed above, and does not affect transfer of data.

Figure 2:
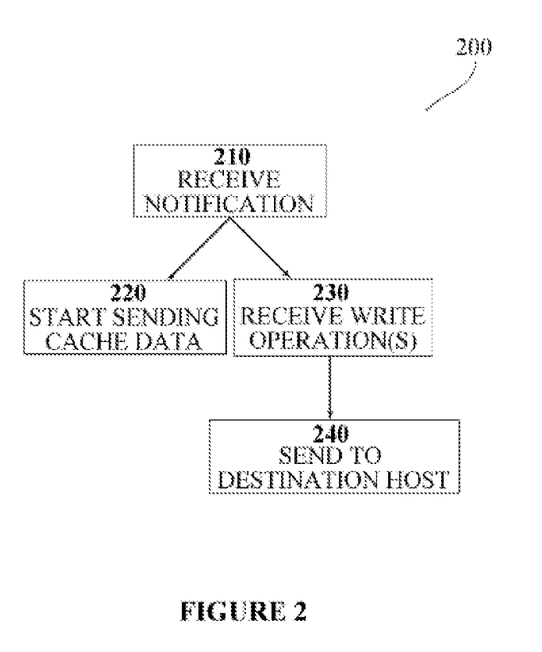
FIG. 2 is a flow diagram of a process in accordance with embodiments of the disclosure.

FIG. 2 illustrates a method performed at an original host, such as the first host 110A. In block 210, the original host receives 210 a notification of migrating a VM, such as VM 120A, from the original host to a destination host, such as second host 110N. Notification may be received by any means discussed above, such as from a cache controller. In one embodiment, it is the VM itself that issues the notification.

Block 220 illustrates sending cache data to the destination host. Sending data is started in response to receiving the aforementioned notification.

While sending cache data, the original host may receive a notification indicating that the VM has been suspended.

Independently of the cache data being sent, the original host may receive one or more write operations after receiving the notification, as is illustrated in block 230. Upon receipt, the original host sends write operations to the destination host, if these write operations are directed to cache data associated with the VM. In some embodiments, only a subset of all cache data associated with the VM is to be sent to the destination host. In these embodiments, write operations directed to cache data that is to remain in the original host cache are applied to that cache, and are not sent to the destination host. Sending cache data is illustrated in block 240.

Figure 3:
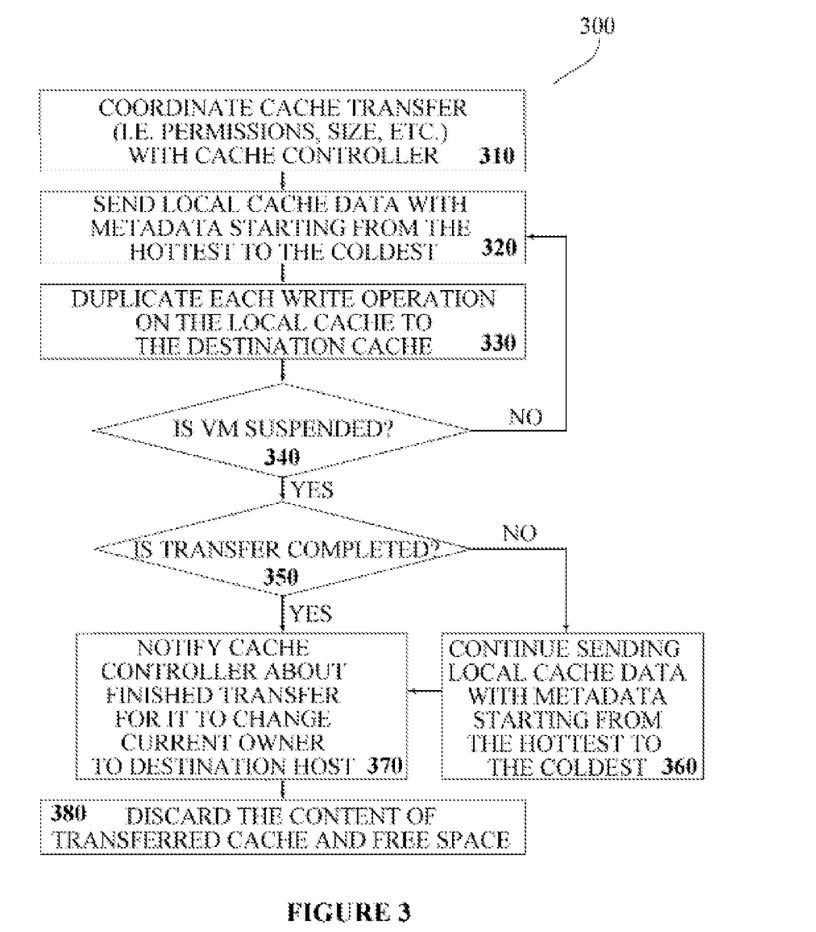
FIG. 3 is a flow diagram of a further process in accordance with embodiments of the disclosure.

FIG. 3 illustrates a further method 300 performed at an original host, such as the first host 110A. Method 300 may be carried out in response to a VM, such as VM 120A, being migrated to a destination host, such as second host 110N.

At block 310, details of an ongoing or upcoming cache transfer to the destination host are coordinated. The coordination may be negotiated by a cache controller. In another embodiment, coordination may be negotiated between both hosts directly. Subject of the coordination may be permissions, size, and/or other properties of data to be sent. In particular, information about data to be transferred may be exchanged in order to accomplish transferring data according to a predefined order, such as a predefined order based on data that was written more or less recently.

At block 320, the original host starts sending local cache data to the destination host. In some embodiments, the local cache data may be sent directly to the destination host. In other embodiments, it may be sent via a cache controller or via alternative routes. Local cache data is not restricted to data stored locally at the original host, such as in first storage 140A or first cache 130A, but may also include data stored at global storage 150 or elsewhere. Local cache data may be associated with a VM to be migrated, such as VM 120A mentioned above. Along with the local cache data, metadata associated with the local cache data may be sent. This metadata may be sent independently of the local cache data, such as by asynchronous communication. Both local cache data and metadata may be sent starting from hottest to coldest. Hottest data may refer to data most recently written to the local cache, while coldest data refers to data that has resided in the cache longer than any other data pertaining to this VM. Alternatively, local cache data may be sent with more frequently accessed cache addresses in favour of less frequently accessed cache addresses.

In case that write operations are received at the original host after sending local cache data has begun, these write operations are duplicated to the cache of the second host. This is reflected by block 330 and is carried out whenever such write operations are received. Duplicating such write operations may comprise communicating the details of the write operation, such as address and/or data to be written, to the destination host or to a cache controller. This step ensures that the content on the destination host is consistent with the original host. In one embodiment, only those write operations directed to cache addresses that have already been sent to the second host may be duplicated as described.

Blocks 320 and 330 are performed until the VM to be migrated is suspended, as indicated at block 340, and/or until transfer has completed, as indicated at block 350. If the VM is found to be suspended at block 340, local cache data may continue to be sent if transfer has not yet completed. This is indicated by block 360, which represents sending local cache data in an identical way as at block 320 discussed above.

Once transfer has completed, a current owner of the cache associated with the migrated VM may be declared at block 370, such as by a notification to a cache controller and/or to the new VM, such as VM 120N. Method 300 closes with discarding, such as deleting, the local cache data and associated data from the first cache at block 380. In some embodiments, block 380 may be omitted in favor of deleting local cache data from the first cache directly after sending it.

Figure 4:
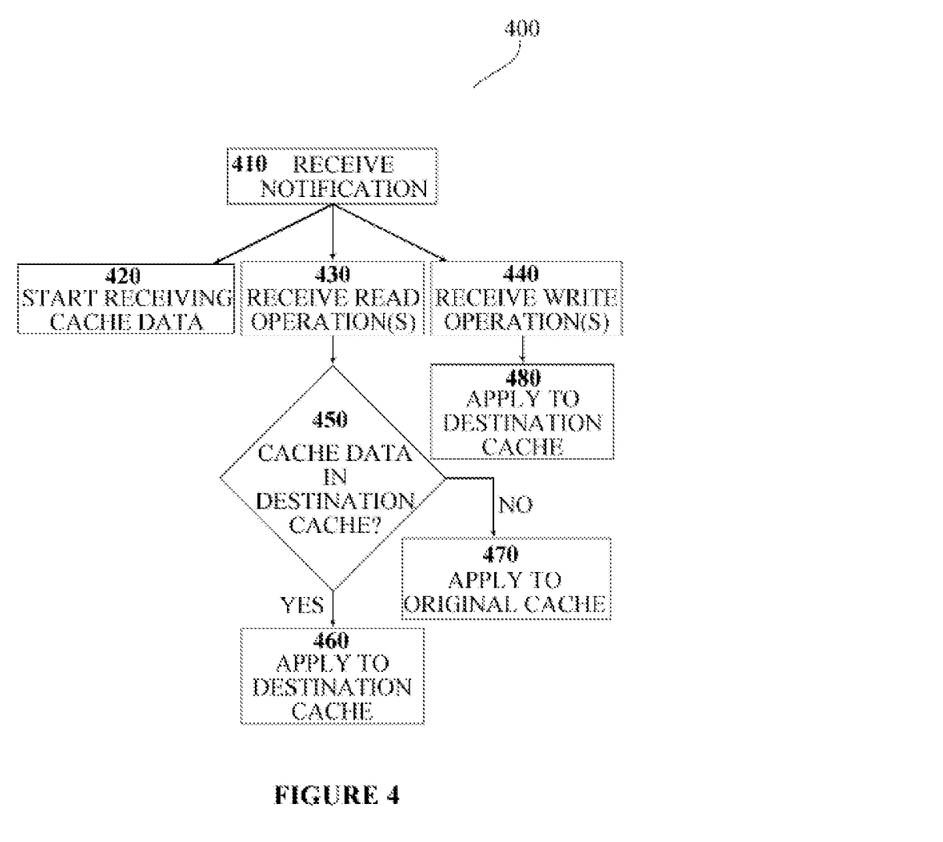
FIG. 4 is a flow diagram of a further process in accordance with embodiments of the disclosure.

FIG. 4 illustrates a further method performed at a destination host, such as at second host 110N. At block 410, a notification regarding migration of a VM, such as VM 110A, from original host to destination host is received at the destination host. In response to receiving this notification, the destination host prepares for receiving cache data to be sent from the original host. In one example, preparing includes identifying free memory space at the destination host. Preparing may also include establishing a reliable connection and negotiating details of the transfer. The destination host then starts receiving cache data at block 420.

While receiving cache data, the destination host may receive a notification of the VM being suspended.

Receiving data at the destination host may include discarding all data and/or metadata that conflicts with data already in the cache of the destination host, or that conflicts with data evicted.

Blocks 430 and 440 illustrate receiving one or more read or write operations after receiving the aforementioned notification. Receiving and handling such operations is independent of the receiving of cache data. The process of receiving cache data may continue for an unknown time period. During this period, operations may be received and acted on by the destination host.

In response to receiving a read operation, the destination host may determine, at a block 450, whether cache data requested by this read operation is present in a cache of the destination host, such as in second cache 130N. The cache data is read from the destination cache in response to determining that the cache data is present therein, as is illustrated in block 460. Otherwise, the read operation is sent to the original host, such as to first host 110A, where it is applied to the original cache, as is illustrated by block 470. Thereafter, the read data may be returned to the destination host.

In response to receiving a write operation, as is illustrated in block 440, the data indicated and/or included in the write operation is written to the destination cache in block 480. In certain embodiments, the data may additionally be written to the cache at the original host.

Receiving cache data at the destination host may conclude with a notification from the original host. In some embodiments, such notification may indicate that ownership of the VM may be changed from original to destination host.

In some cases, the transfer of cache data may be aborted, such as in response to detecting that a threshold time period has expired without receiving any cache data at the destination host, or such as in response to receiving another notification regarding a further migration of the VM.

Advantages provided by embodiments discussed herein include seamless migration of a VM. This seamlessness shows when handling read and write operations: Even though the VM is in the process of being migrated from one host to another, operations directed to cache data associated with the VM may be handled.

Figure 5:
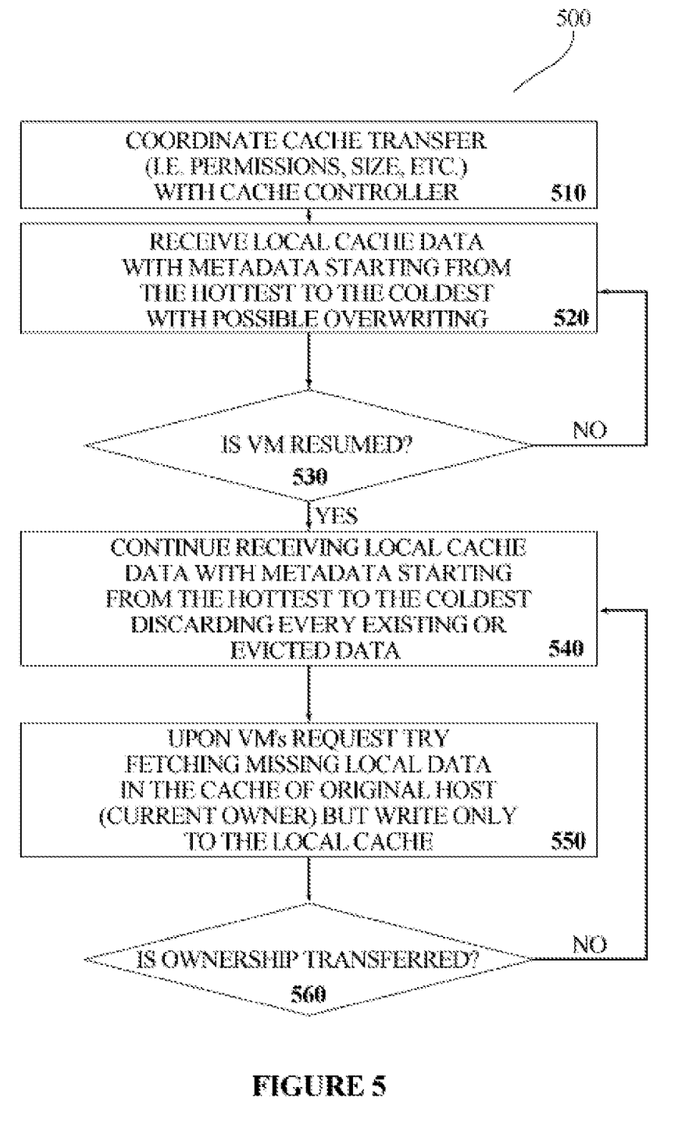
FIG. 5 is a flow diagram of a further process in accordance with embodiments of the disclosure.

FIG. 5 illustrates a further method 500 performed at a destination host, such as the second host 110N. Method 500 may start in response to a notification concerning migration of a VM from an original host, such as first host 110A, to a destination host, such as second host 110N. Similar to step 310 in FIG. 3, details of cache transfer may be coordinated at step 510. This coordination may be performed in direct communication with the original host, or may be performed via a cache controller. The coordinated details may be identical to those discussed above with regard to FIG. 3.

Subsequent to coordinating, local cache data from the original host is received at the destination host at block 520. Again, the details of the local cache data discussed with regard to FIG. 3 apply to this step. In one embodiment, receiving local cache data at the destination host may include overwriting older versions of this data in a cache of the destination host, such as in second cache 130N. Block 520 repeats until notification is received at block 530 that the VM to be migrated has been resumed at the destination host. Such resuming typically occurs subsequent to suspending the VM on the original host in the course of migrating the VM from the original host to the destination host. Suspending a VM has been discussed above with regard to block 340 of FIG. 3.

Once the VM has been resumed, method 500 continues at block 540, where the destination host continues to receive local cache data. However, if local cache data received from the original host is detected to be already present at the destination host, in particular detected to be in a different state on the destination host, the received local cache data will be discarded, and will not be used to overwrite corresponding data at the destination host.

In some embodiments, method 500 at block 550 requests local cache data from the original host after the VM is resumed and in response to detecting that said local cache data is still missing in the destination host. Such request may be made upon request of the VM. After obtaining the local cache data, it may be written to the local cache of the destination host.

Blocks 540 and/or 550 may proceed until ownership of the local cache data has actually changed from the VM on the original host to the VM on the destination host, as is illustrated by block 560.

Figure 6:
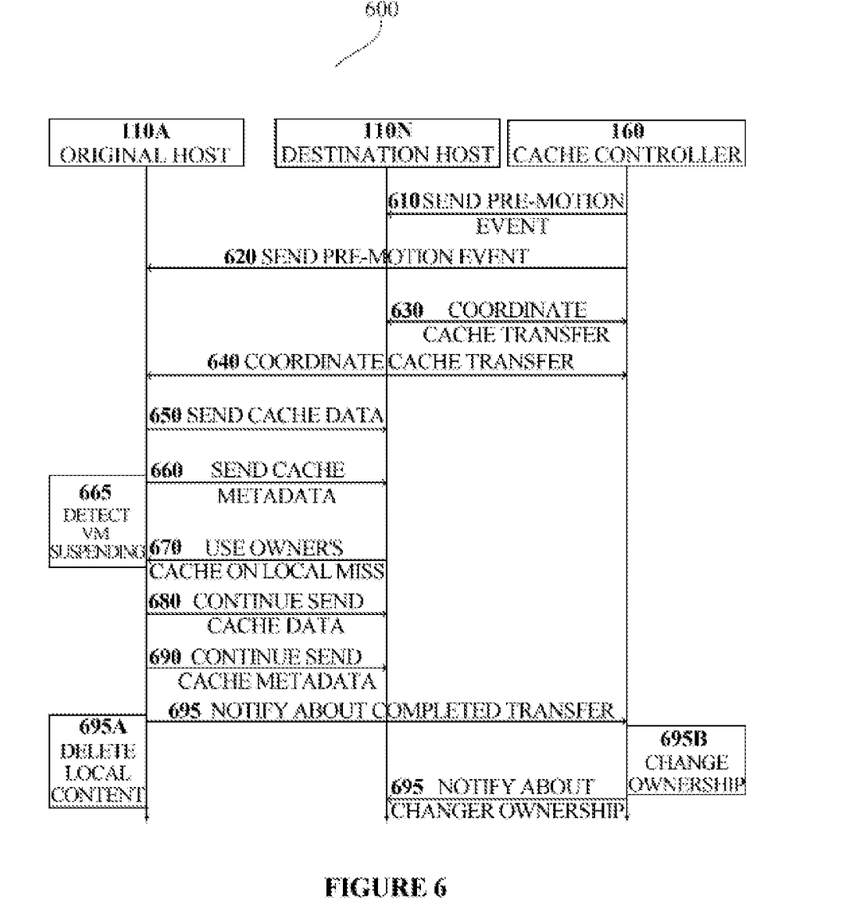
FIG. 6 is a sequence diagram of a further process in accordance with embodiments of the disclosure.

FIG. 6 is a sequence diagram illustrating operation of an original host and a destination host during migration of a VM. Sequence 600 starts with sending pre-motion events to original host and destination host at steps 610 and 620. An example of an original host is the first host 110A discussed above. An example of the destination host is the second host 110N. Pre-motion events indicate that a VM is to be migrated from one host to another, and may be sent by a cache controller 160. However, a cache controller is not compulsory for the disclosure to work, and pre-motion events may as well be sent by any other party, such as by the VM that is to be migrated. At steps 630 and 640, details of a cache transfer may be coordinated. In the illustrated embodiment, this is performed by the cache controller which defines transfer characteristics by messages to the original host and the destination host. In other embodiments, the coordination may be performed by the VM to be migrated, or by direct communication of the original host with the destination host.

Sequence 600 proceeds with the original host sending cache data and cache metadata in steps 650 and 660. These steps have been discussed above, such as with regard to block 320 of FIG. 3 and block 520 of FIG. 5.

At some point during sending said data, step 665 may detect that the VM has suspended on the original host. In response thereto, the destination host may request data at step 670 from the original host in response to experiencing a local miss for data pertaining to the VM. Also subsequent to detecting that the VM was suspended, the original host continues sending cache data and cache metadata to the destination host at steps 680 and 690. This is analogous to block 360 of FIG. 3 and to block 540 of FIG. 5.

At step 695, the original host may notify the destination host and/or the cache controller about the transfer having completed. Alternatively, the destination host may detect the completion by itself, such as by monitoring the VM on the original host. As yet another alternative, the VM itself may notify the destination host.

Subsequent to step 695, the original host may delete sent cache data, as depicted at step 695A. Alternatives to this step may be performed according to the discussion of block 380 of FIG. 3 above. Also subsequent to step 695, ownership of the VM may be changed from the original host to the destination host at step 695B. This step may be performed by the cache controller or by the VM. If step 695B is performed by the cache controller, the destination host is notified thereof in an optional step 695.

Sequence 600 hence concludes with all data of the VM having migrated from original to destination host, and with migration of the VM having completed.

A further advantage is that operations are not only handled despite an ongoing migration, but that their respective handling takes account of the migration phase, such as of whether cache data is still being sent to the destination. This avoids any downtime in the caching service. Before migration, read and write operations may be handled at a cache associated with the VM at its original site. During migration, write operations at the original host may be sent to the destination host. This advantageously populates the cache at the destination host with data ready to be used when migration has completed. Further, data is ensured to be written at the destination location, where it may be expected to be accessed again soon. In embodiments which include applying the write operation both at the original host and the destination host, any cache invalidation is avoided, hence reducing the number of accessed to the first or second cache or to global storage.

Also during migration, read operations at the destination host are conditionally sent to the original host if not present in the destination host cache. Thereby, embodiments of the disclosure take account of the fact that cache data copying, while still in progress, may already have delivered the data to be read at the destination. A significant advantage is that fewer read operations have to be sent to the original host as the sending of cache data progresses. Hence, responsiveness of the VM at the destination host increases while still in the process of migrating. Embodiments which include a particular order of cache data further add to these advantages in that they increase the likelihood of data found on the destination host while migrating, even though not all cache data may have been sent yet. This advantage is due to the insight that more frequently accessed data and/or more recently accessed data is likely to be accessed again in the near future, and that preferring this data can further improve responsiveness of the VM at the destination.

Yet another advantage is that cache data is transferred from one host to another without flushing invalidated cache data to first storage or global storage, hence further increasing the velocity of the process.

An inventive step is established at least by starting sending of cache data from original host to destination host, together with handling incoming read and/or write operations without delay. In some cases, the handling per se increases responsiveness, such as when write operations are forwarded to the destination.

Although the present disclosure and its advantages have been described in detail, it should be understood that various changes, substitutions and alterations can be made herein without departing from the spirit and scope of the disclosure as defined by the appended claims.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A system, comprising:
    a first host comprising a first cache and associated with a virtual machine (VM); and
    a second host comprising a second cache;
    wherein the first host is configured to send cache data of the first cache to the second host in response to a notification, said cache data associated with the VM and said notification indicating that the VM is to be migrated from the first host to the second host, and wherein the first host is configured to send write operations associated with the VM to the second host in response to receiving the notification; and
    wherein the second host is configured to:
        determine whether said cache data requested by read operations is present in the second cache of the second host;
        apply, in response to receiving the notification, read operations associated with said cache data of the VM to the first cache when said cache data is not present in the second cache;
        apply read operations associated with said cache data of the VM to the second cache when said cache data is present in the second cache; and
        apply write operations associated with cache data of the VM to the second cache.

2. The system according to claim 1, wherein the second host is further configured to apply read operations associated with the VM to the second cache in response to determining that no further cache data of the VM is to be sent from the first host to the second host.

3. The system according to claim 1, wherein the first host is further configured to delete sent cache data in the first cache in response to determining that no further cache data of the VM is to be sent from the first host to the second host.

4. The system according to claim 1, further comprising a cache controller configured to send the notification.

5. The system according to claim 1, wherein sending cache data includes sending any of most recently retrieved, most recently written, and most frequently accessed data first.

6. The system according to claim 1, said cache data including cache metadata.

7. The system according to claim 1, wherein the first host is further configured to apply write operations associated with the VM to the first cache in addition to sending said write operations to the second host.

8. A host device comprising a local cache, a processor, and a memory, wherein the memory has a plurality of instructions stored thereon, that when processed by the processor, cause the processor to be configured to:
    receive, in response to a notification, cache data from a remote cache of a remote host, said cache data associated with a virtual machine(VM), said VM associated with the remote host;
    determine whether said cache data requested by read operations is present in the local cache;
    apply read operations associated with cache data of said VM to the remote cache when said cache data is not present in the local cache, and write operations associated with cache data of the VM to the local cache, said notification indicating that the VM is to be migrated from the remote host to the host device; and
    apply read operations associated with said cache data of said VM to the local cache when said cache data is present in the local cache.

9. The host device according to claim 8, wherein the instructions further cause the processor to be configured to:
    apply read operations associated with the VM to the local cache in response to determining that no further cache data of the VM is to be sent from the remote host to the host device.

10. The host device according to claim 8, wherein the notification is sent by a cache controller.

11. The host device according to claim 8, wherein sending cache data includes sending any of most recently retrieved, most recently written, and most frequently accessed data first.

12. The host device according to claim 8, wherein said cache data includes cache metadata.

13. A method of distributed cache live migration, comprising:
    in response to a notification, receiving cache data from a first cache of a first host, wherein said cache data is associated with a virtual machine(VM);
    determining whether said cache data requested by read operations is present in a second cache of a second host;
    applying, after receiving the notification, read operations associated with the VM to said first cache of the first host when said cache data is not present in the second cache;
    applying read operations associated with the VM to the local second cache when said cache data is present in the second cache; and
    applying, after receiving the notification, write operations associated with cache data of the VM to the second cache of the second host, said notification indicating that the VM is to be migrated from the first host to the second host.

14. The method according to claim 13, wherein the notification is sent by a cache controller.

15. The method according to of claim 13, said cache data including cache metadata.

* * * * *